(12) United States Patent
Krupp et al.

(10) Patent No.: US 7,681,916 B2
(45) Date of Patent: Mar. 23, 2010

(54) GAS GENERATING SYSTEM WITH AXIAL FLOW FILTER

(75) Inventors: Robert M. Krupp, Rochester, MI (US); Donald B. Patterson, Rochester, MI (US)

(73) Assignee: TK Holdings, Inc., Armada, MI (US)

( * ) Notice: Subject to any disclaimer, the term of this patent is extended or adjusted under 35 U.S.C. 154(b) by 409 days.

(21) Appl. No.: 11/648,457

(22) Filed: Dec. 29, 2006

(65) Prior Publication Data

US 2007/0152434 A1 Jul. 5, 2007

Related U.S. Application Data

(60) Provisional application No. 60/754,971, filed on Dec. 29, 2005.

(51) Int. Cl.
*B60R 21/26* (2006.01)
*B01D 46/10* (2006.01)
*B01D 46/24* (2006.01)

(52) U.S. Cl. ............... 280/742; 280/736; 280/740; 55/520; 55/521; 428/116; 428/118

(58) Field of Classification Search ............ 55/520, 55/521; 280/736, 740, 741, 742; 428/116, 428/118
See application file for complete search history.

(56) References Cited

U.S. PATENT DOCUMENTS

| | | | | |
|---|---|---|---|---|
| 3,966,646 A | * | 6/1976 | Noakes et al. | 502/439 |
| 4,300,956 A | * | 11/1981 | Rosenberger et al. | 148/285 |
| 4,755,360 A | * | 7/1988 | Dickey et al. | 422/122 |
| 5,137,696 A | * | 8/1992 | Hitachi et al. | 422/180 |
| 5,395,600 A | * | 3/1995 | Cornelison | 422/18 |
| 5,552,123 A | * | 9/1996 | Numoto et al. | 422/180 |
| 5,660,606 A | * | 8/1997 | Adamini | 55/337 |
| 5,866,230 A | * | 2/1999 | Maus | 428/116 |
| 6,149,877 A | * | 11/2000 | Ogai | 422/180 |
| 6,298,789 B1 | * | 10/2001 | Ericsson et al. | 102/530 |
| 6,481,747 B1 | * | 11/2002 | Astrauskas et al. | 280/741 |
| 6,581,963 B2 | * | 6/2003 | Mangum | 280/741 |
| 6,871,873 B2 | * | 3/2005 | Quioc et al. | 280/741 |
| 7,059,635 B2 | * | 6/2006 | Ryobo et al. | 280/741 |
| 7,360,787 B2 | * | 4/2008 | Englbrecht et al. | 280/736 |
| 2004/0256847 A1 | * | 12/2004 | Quioc et al. | 280/741 |
| 2005/0268788 A1 | * | 12/2005 | Kaiser | 96/417 |

* cited by examiner

*Primary Examiner*—Michael A Marcheschi
*Assistant Examiner*—Robert A Clemente
(74) *Attorney, Agent, or Firm*—L. C. Begin & Associates, PLLC.

(57) ABSTRACT

A filter for use in absorbing heat from gases generated in a gas generating system is disclosed. The filter includes a plurality of discrete, continuous gas flow passages extending therethrough. In one embodiment, the filter is incorporated into an inflator used for inflating an inflatable element of a vehicle occupant protection system. A gas generator incorporating the filter and a vehicle occupant protection system incorporating the filter are also described.

19 Claims, 4 Drawing Sheets

GAS GENERATING SYSTEM WITH AXIAL FLOW FILTER

CROSS REFERENCE TO RELATED APPLICATIONS

This application claims the benefit of provisional application Ser. No. 60/754,971, filed on Dec. 29, 2005.

BACKGROUND OF THE INVENTION

The present invention relates generally to gas generating systems for use in inflatable occupant restraint systems in motor vehicles and, more particularly, to gas generating systems that incorporate a filter for removal of particulates from combustion gases and cooling of the gases.

Some gas generating system designs include cylindrical housings and one or more filters positioned within the housing and configured to direct a flow of combustion gases in a radially outward direction, cooling the gases and removing particulates from the gases. Due to high gas velocities and the relatively small diameters of existing gas generator housings, the residence time (i.e., the time the gases spend transiting and interacting with the filter) is relatively short with existing radial flow filter configurations. This short residence time undesirably limits the degree to which the gases can be cooled and the amount of particulates that are removed from the gases.

SUMMARY OF THE INVENTION

In accordance with the present invention, a filter is provided for absorbing heat from gases generated in a gas generating system is disclosed. The filter includes a plurality of discrete, continuous gas flow passages extending therethrough. In one embodiment, the filter is incorporated into an inflator used for inflating an inflatable element of a vehicle occupant protection system. A gas generator incorporating the filter and a vehicle occupant protection system incorporating the filter are also described.

DETAILED DESCRIPTION

Figure 1:
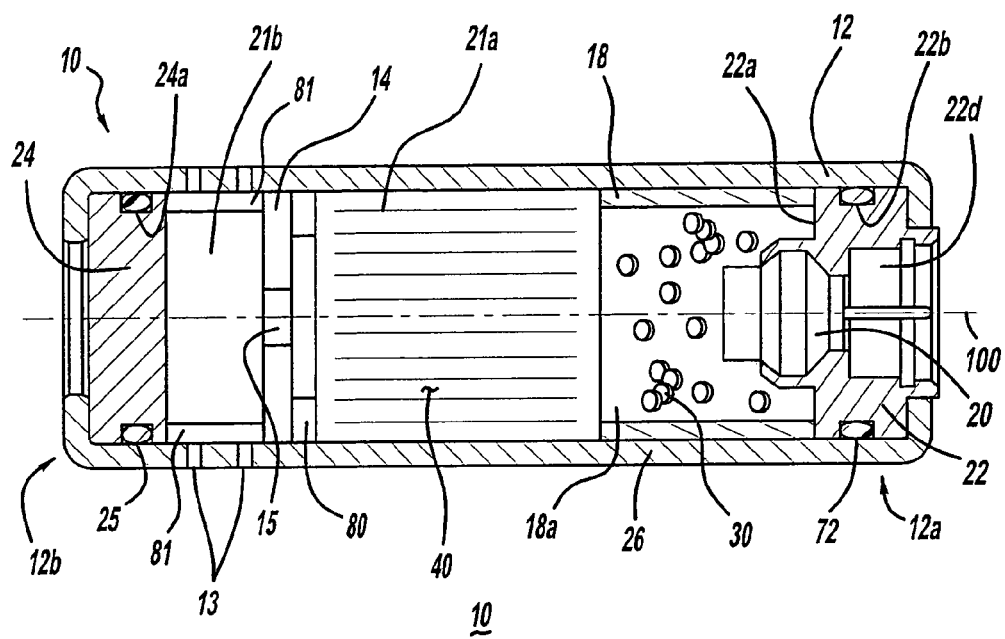
FIG. 1 is a cross-sectional side view of one embodiment of a gas generating system in accordance with the present invention.

FIG. 1 shows one embodiment of a gas generating system 10 in accordance with the present invention. In the embodiments set forth herein, the gas generating system is used as an inflator for generating inflation gas for one or more inflatable elements of a vehicle occupant protection system. However, other uses of the gas generating system are also contemplated. Referring to FIG. 1, gas generating system 10 includes a substantially cylindrical housing 12 having a pair of opposed ends 12a, 12b and a wall 26 extending between the ends to define a housing interior cavity. Housing 12 is made from a metal or metal alloy and may be drawn, extruded, or otherwise metal-formed. Alternatively, housing 12 may be formed from a suitable high-temperature resistant polymer. A first end closure 22 is secured to end 12a of housing 12, and a second end closure 24 is secured to an opposite end 12b of housing 12 using one or more known methods. In FIG. 1, ends 12a and 12b of housing 12 are crimped over portions of first and second end closures 22, 24 to secure the end closures within the housing. End closures 22, 24 may be machined, cast, or otherwise metal formed and may be made from carbon steel or stainless steel, for example. Alternatively, end closures 22 and 24 may be molded from a suitable high-temperature resistant polymer or ceramic material.

Referring to FIG. 1, first end closure 22 has formed therealong a peripheral shoulder 22a, a peripheral cavity 22b, and a central orifice 22d. A first O-ring or seal 72 is positioned in peripheral cavity 22b to seal the interface between first end closure 22 and housing wall 26. Second end closure 24 has formed therein a peripheral cavity 24a. A second O-ring or seal 25 is positioned in peripheral cavity 24a to seal the interface between second end closure 24 and housing wall 26.

A perforated internal divider 14 is disposed within the housing cavity intermediate the ends of the housing, defining adjacent first and second chambers 21a and 21b, respectively, within housing 12 along axis 100. In the embodiment shown in FIG. 1, divider 14 is a flat, substantially cylindrical member having one or more gas exit apertures 15 formed therein. Chamber 21a houses a filter 40 (described in greater detail below) for cooling combustion gases. Chamber 21b forms a diffuser chamber for receiving gases therein through divider aperture 15. Divider 14 is formed from metal, ceramic, or another suitable high-temperature resistant material and is oriented along a plane perpendicular to a longitudinal axis 100 of housing 12. Divider 14 is roll-crimped or otherwise secured within housing 12 so as to maintain the divider in its position within the housing when the divider is subjected to pressures generated by combustion of gas generants (described below) positioned within the housing.

Referring again to FIG. 1, a plurality of gas exit apertures 13 is formed along housing wall 26 to permit fluid communication between housing chamber 21b and an airbag (not shown) or other inflatable element. Those skilled in the art will appreciate that the number, shape, size and spatial distribution of apertures 13 along housing wall 26 may be specified according to a variety of design requirements, without departing from the spirit and scope of the present invention.

Referring again to FIG. 1, a first annular spacer 18 is positioned within housing 12 between a filter 40 (described below) and first end closure 22 for positioning and securing filter 40 spaced apart from first end closure 22, thereby forming a combustion chamber 18a along axis 100 for containing a gas generant composition 30 therein. In alternative embodiments (not shown), spacer 18 may be formed integral with filter 40 or end closure 22, or filter 40 may be secured in a position spaced apart from end closure 22 using another method (for example, roll-crimping of portions of housing 12 over edges of end closure 22 and filter 40.) Spacer 18 may be rolled, extruded, molded, or otherwise formed from a metal, ceramic, or other high-temperature resistant material.

A quantity of a propellant or gas generant composition 30 is positioned in chamber 18a. Any suitable propellant might be used and exemplary compounds are disclosed, for example, in U.S. Pat. Nos. 5,872,329, 6,074,502, and 6,210,505, incorporated herein by reference. The compositions described in these patents exemplify, but do not limit, gas generant compositions useful in the application described herein.

Referring again to FIG. 1, gas generating system 10 also includes an initiator 20 coupled to housing 12 in a position that enables fluid communication between the initiator and enclosure 18a upon activation of the gas generating system, for initiating combustion of gas generant composition 30. In the embodiment shown in FIG. 1, initiator 20 is secured in central orifice 22d of first end closure 22 and extends into enclosure 18a. Initiator 20 may be secured in first end closure central orifice 22d by the use of crimping, fasteners, adhesives, or other known methods. On example of an initiator suitable for use in the inflator of the present invention is described in U.S. Pat. No. 6,009,809, incorporated herein by reference.

Referring now to FIGS. 1-5, gas generating system 10 also includes a filter, generally designated 40, configured to channel a flow of combustion gas in a direction generally parallel to longitudinal axis 100 of housing 12, and for absorbing heat from the generated gases. Filter 40 has a plurality of discrete, continuous gas flow passages extending therethrough. As used herein, the term "discrete" is understood to mean that each gas flow passage is distinct and separate from (i.e., not in fluid communication with) any other passage for the entire length of the passage or at least for substantially the entire length of the passage. The gas flow passages in filter 40 are substantially parallel with each other. In the embodiments shown in FIGS. 1-5, axis 100 extends through the filter and the gas flow passages extend substantially parallel with axis 100.

In particular embodiments 40a and 40b, shown in FIGS. 2-3 and 4-5, the filter includes a first end face 41 and a second end face 42 opposite the first end face. Gas flow passages 43 and 44 extend between first end face 41 and second end face 42 to convey gases between the first and second end faces. In addition, in the embodiments shown in FIGS. 2-3 and 4-5, openings in the ends of passages are formed along first and second end faces 41, 42 so that gases may only enter or exit the filter via first end face 41 and second end face 42. Also, in the embodiments shown in FIGS. 2-3 and 4-5, gas glow passages 43, 44 are also formed such that each passage has a substantially continuous cross-sectional shape along a length of the passage, and the gas glow passages are also formed such that each passage has a substantially continuous cross-sectional area along a length of the passage. Filter 40 may be formed from one or more metallic materials or any other material suitable for absorbing heat from gases generated by combustion of gas generant 30. Filter 40 may be plated with known substances such as zinc, tin, or other metals or metal alloys to protect the surfaces of the filter against corrosion or oxidation.

In the embodiment shown in FIG. 1, filter 40 occupies substantially an entire interior volume of the housing along a portion of the housing. Thus, inflation gases generated in combustion chamber 18a are forced through filter 40 and into diffuser chamber 21b. Also, in the embodiment shown in FIG. 1, filter 40 has a substantially circular cross-section which conforms to the substantially cylindrical cross-sectional shape of housing wall 26, permitting an outer edge of filter 40 to abut housing wall 26 in the interior of the housing.

Figure 2:
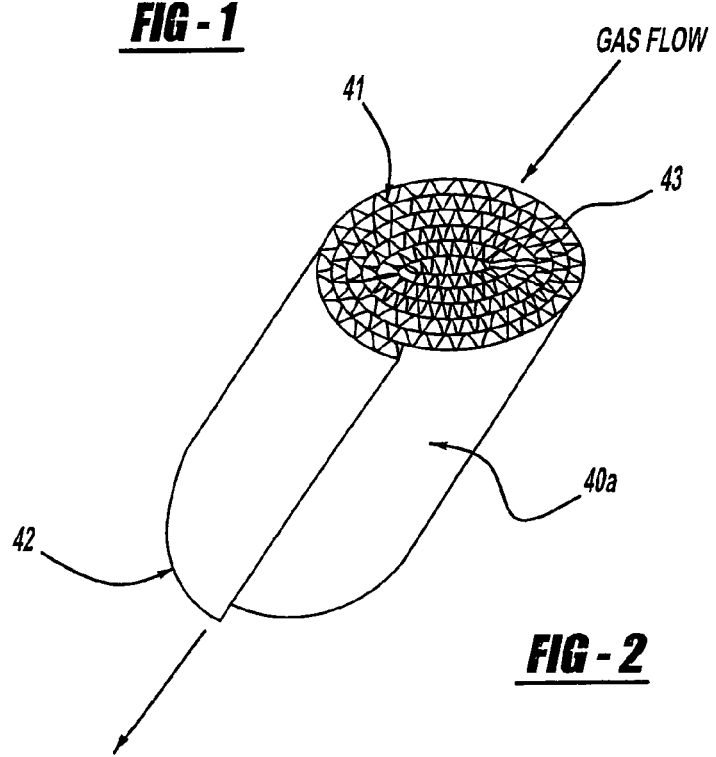
FIG. 2 is a perspective view of a first embodiment of an axial filter suitable for incorporation into the gas generating system of FIG. 1.
Figure 3:
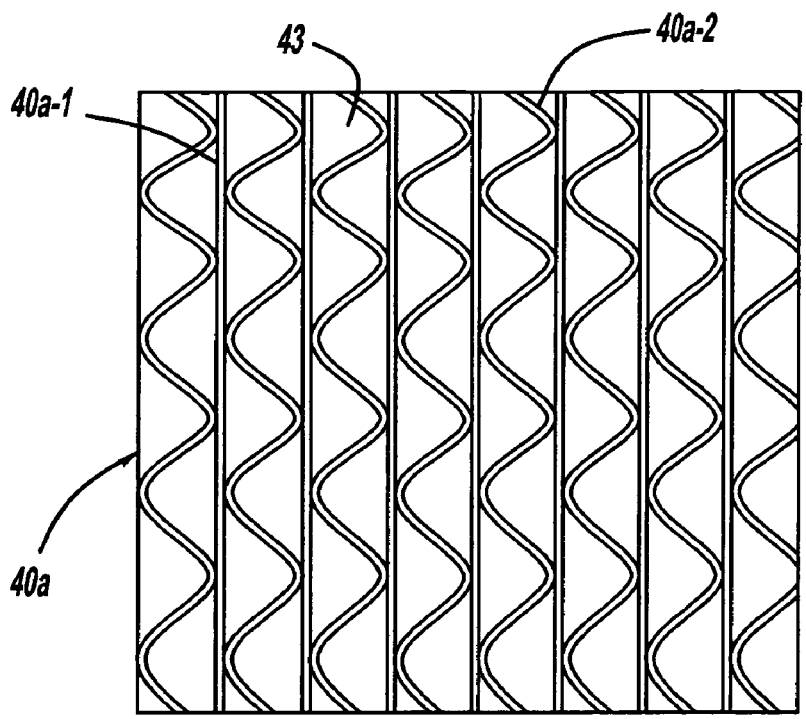
FIG. 3 is an enlarged cross-sectional view a portion of the filter embodiment shown in FIG. 2.

In a first particular embodiment 40a (seen in FIGS. 2-3), a corrugated metallic material is formed into a longitudinal, generally cylindrical configuration so as to be insertable into housing 12 to abut housing wall 26, thereby providing gas flow passages 43 having substantially corrugated cross-sectional shapes. FIG. 2 shows a filter 40a formed from alternating stacked flat and corrugated metal sheets (fabricated by roll-forming or other methods from, for example, aluminum or steel) rolled into a cylinder suitable for incorporation into housing 12. FIG. 3 shows an enlarged cross-sectional view of the filter embodiment shown in FIG. 2. Filter 40a comprises at least one relatively flat metal sheet 40a-1 and at least one corrugated metal sheet 40a-2 positioned along sheet 40a-1 in contact with sheet 40a-1. To assemble the filter, layers of sheets 40a-1 and 40a-2 are cut to size, and an unrolled layer of corrugated sheet 40a-2 is placed upon an unrolled layer of sheet 40a-1. Portions of sheets 40a-1 and 40a-2 may be secured to each other if desired (for example, by welding, brazing, soldering, adhesive application, etc.) to facilitate the rolling process. The stacked sheets are then rolled into the generally cylindrical configuration shown in FIG. 2. Edges of sheets 40a-1 and 40a-2 residing along an outer surface of the resulting cylinder may be trimmed as desired. Sheets 40a-1 and 40a-2 may both be obtained from known sources. For example, one source for corrugated sheet 40a-2 is Corrugated Metals, Inc., of Belvidere, Ill. U.S. Pat. No. 5,447,697, incorporated herein by reference, describes one method for forming a corrugated structure as contemplated herein. Other methods for forming the corrugated structure may also be used.

Figure 4:
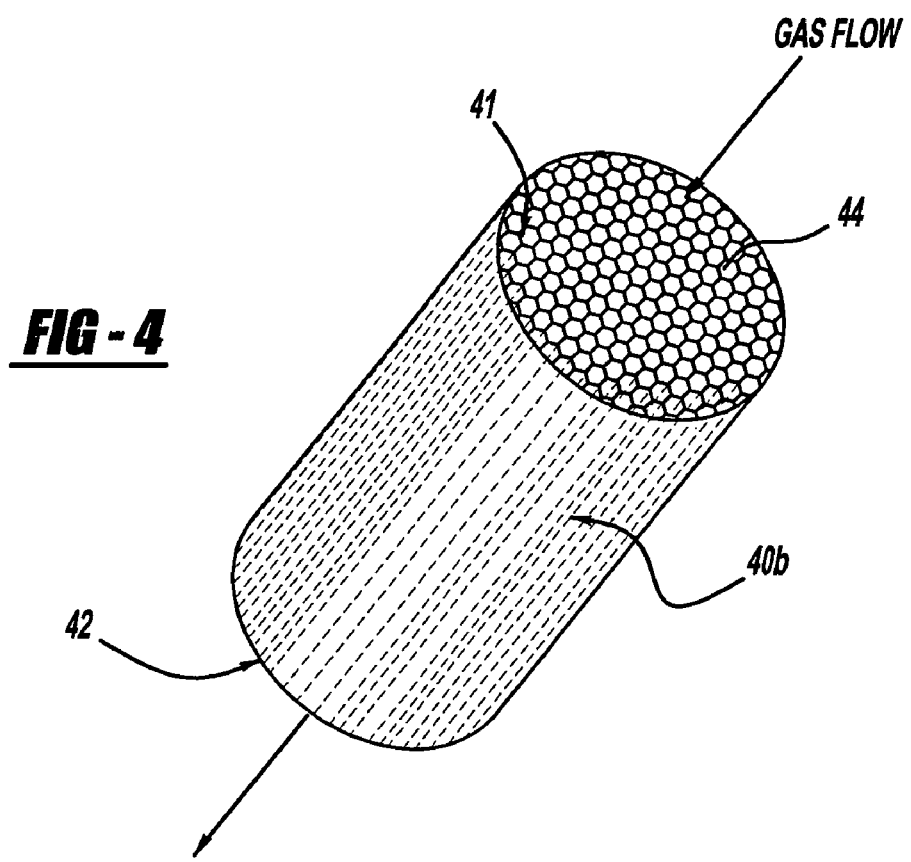
FIG. 4 is a perspective view of a second embodiment of an axial flow filter suitable for incorporation into the gas generating system of FIG. 1.
Figure 5:
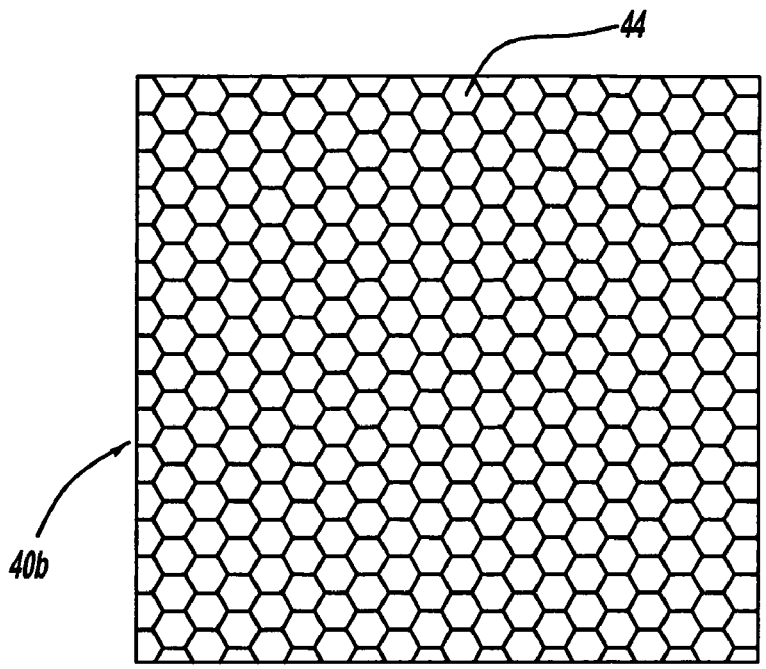
FIG. 5 is an enlarged cross-sectional view a portion of the filter embodiment shown in FIG. 4.

Referring to FIG. 4, in a second particular embodiment, a honeycombed (or substantially hexagonal) filter structure 40b is formed into a longitudinal, generally cylindrical configuration so as to be insertable into housing 12 to abut housing wall 26 as previously described, thereby providing gas flow passages 44 having substantially hexagonal cross-sectional shapes. FIG. 5 shows an enlarged cross-sectional view of the filter embodiment shown in FIG. 4. The honeycomb filter 40b may be produced using known processes, such as casting, molding, or extrusion. U.S. Pat. Nos. 6,641,385, 5,618,633, 6,183,836, 4,181,571, and published U.S. Patent Application No. 2002/0153356, all incorporated herein by reference, all disclose methods for forming hexagonal structures similar to filter 40b.

Figure 6:
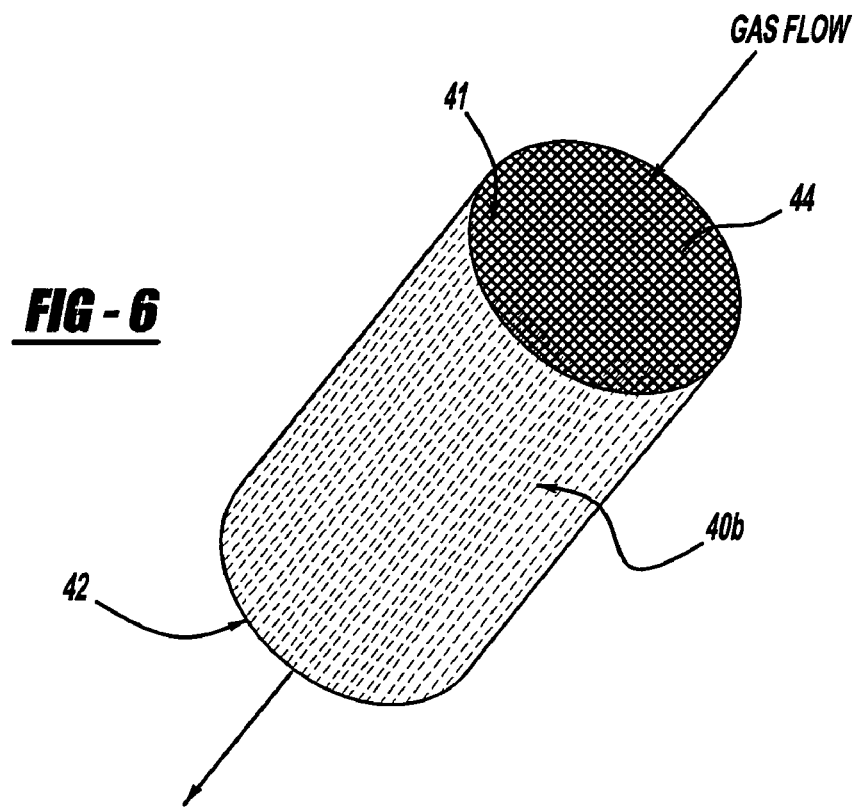
FIG. 6 is a perspective view of a third embodiment of an axial flow filter suitable for incorporation into the gas generating system of FIG. 1.
Figure 7:
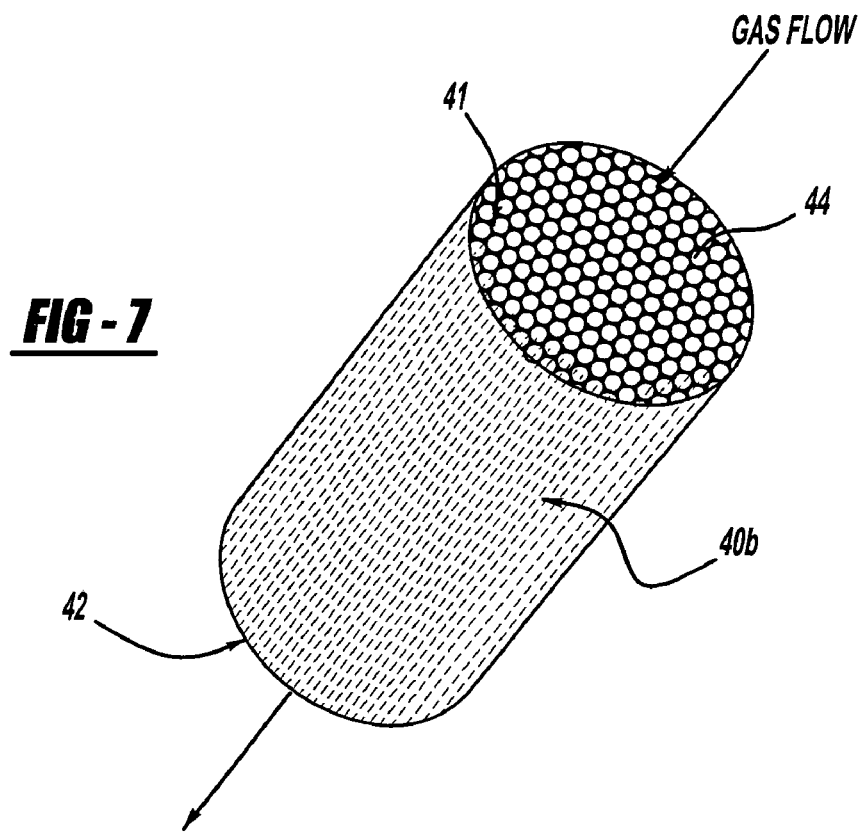
FIG. 7 is a perspective view of a fourth embodiment of an axial flow filter suitable for incorporation into the gas generating system of FIG. 1.

Corrugated filter 40a and honeycombed filter 40b each act as a heat sink and a filter to cool combustion gases and remove combustion by-products from the gas flow. Providing a relatively large number of gas flow passages aids in maximizing the filter surface area contacted by the gas flow as the gases pass through the filter. Providing passages oriented along a longitudinal axis of the gas generator increases the flow path length of gases through the filter, thereby increasing the residence time of the gases within the filter, permitting greater heat transfer from the gases and particulate accumulation by the filter surfaces in comparison with existing radially-directing filters and obviating the need to provide space for a radial-flow filter within the gas generator housing. Besides the substantially sinusoidal filter passage shape of corrugated filter structure 40a and the substantially hexagonal filter passage shape of filter structure 40b, other filter passage shapes are also contemplated, subject to design and manufacturing considerations. For example, gas flow passages having rectangular (FIG. 6), elliptical (including circular) (FIG. 7), and/or other cross-sectional shapes may be used.

In yet another particular embodiment, filter 40 is coated with a catalytic substance which promotes one or more chemical reactions in the generated gases, depending on the catalytic material used. Examples of suitable catalytic coatings include coatings containing platinum group metals such as platinum, palladium, and rhodium, and other known catalysts. In yet another particular embodiment, filter 40 is coated with one or more materials which chemically react with the generated gases (depending on the composition of the gases) to change the composition of the gases during passage of the gases through the filter.

The structure of filter 40, incorporating a relatively large number of relatively long gas flow passages, acts to maximize the residence time of the generated gases within the filter and also the contact area between the gases and the filter material. This facilitates heat transfer to the filter, the completion of combustion reactions in the gas generant, and the completion of any other desired chemical reactions within the inflator.

Referring again to FIG. 1, another annular spacer 80 is positioned between filter 40 and divider 14 to space filter 40 apart from divider 14. Spacer 80 thus provides a gap between filter 40 and divider 14 to allow the gases to exit end portions of the filter and coalesce into a centralized flow through aperture 15 formed in divider 14. Spacer 80 may be stamped, molded, cut, or otherwise formed from a metal, ceramic, or other high-temperature resistant material. Spacer 80 may be roll-crimped in position along with divider 14. Spacer 80 may alternatively be adhesively attached to divider 14, or may be formed integral with divider 14.

One or more additional spacers 81 may be positioned in diffuser chamber 21b between divider 14 and second end closure 24 to space end closure apart from divider 14. This additional spacer may also bear against divider 14 to support end closure 24 in position for crimping at housing second end 12b. Alternative methods for spacing end closure 24 apart from divider 14 may be also used. For example, edge portions of filter 40 and end closure 24 may retained in their desired positions by roll-crimps formed in suitable positions along the housing. Spacers 81 may be stamped, molded, cut, or otherwise formed from a metal, ceramic, or other high-temperature resistant material.

Burst foils or disks, as known in the art, may be secured over openings 15 and/or 13 if desired, according to engineering requirements.

Referring again to FIG. 1, upon activation of the gas generating system, initiator 20 ignites gas generant 30 to produce combustion gases. The gases then flow through filter 40 and divider aperture 15 into chamber 21b, exiting gas exit apertures 13 formed along housing wall 26.

Figure 8:
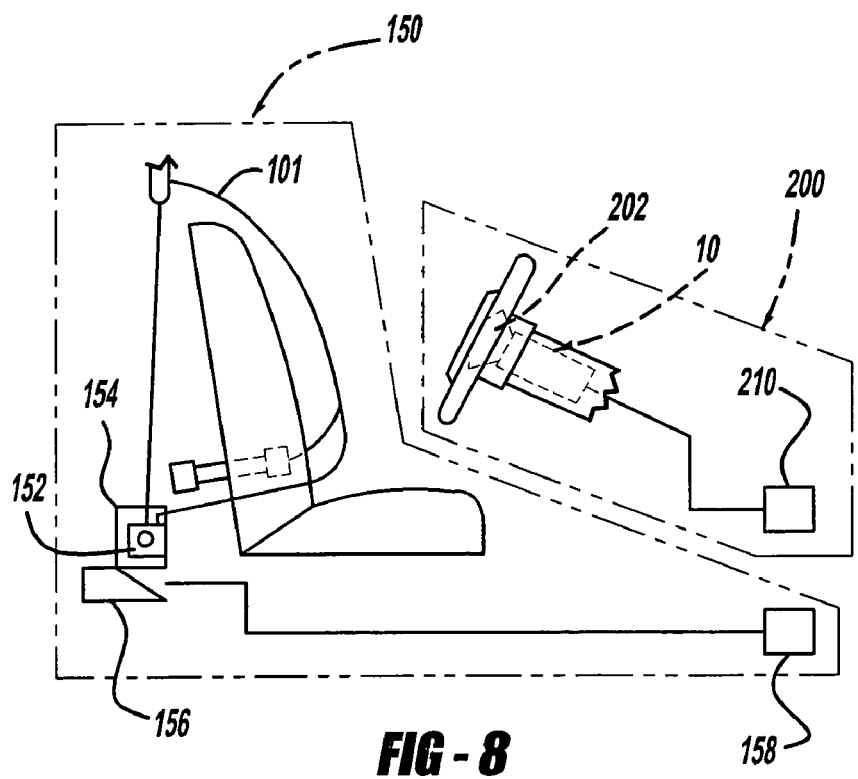
FIG. 8 is a schematic representation of an exemplary vehicle occupant restraint system including a gas generating system incorporating a filter in accordance with the present invention.

Referring now to FIG. 8, any of the filter embodiments described above may also be incorporated into a gas generating system included in an airbag system 200. Airbag system 200 includes at least one airbag 202 and a gas generating system 10 incorporating a filter in accordance with the present invention and coupled to airbag 202 so as to enable fluid communication with an interior of the airbag. Airbag system 200 may also include a crash event sensor 210 in communication with gas generating system 10. In a manner known in the art, crash event sensor 210 operates in conjunction with a known crash sensor algorithm that signals actuation of airbag system 200 via, for example, activation of initiator 20 (not shown in FIG. 8) in the event of a collision.

Referring again to FIG. 8, airbag system 200 may also be incorporated into a broader, more comprehensive vehicle occupant restraint system 180 including additional elements such as a safety belt assembly 150. FIG. 8 shows a schematic diagram of one exemplary embodiment of such a restraint system. Safety belt assembly 150 includes a safety belt housing 152 and a safety belt 101 extending from housing 152. A safety belt retractor mechanism 154 (for example, a spring-loaded mechanism) may be coupled to an end portion of the belt. In addition, a safety belt pretensioner 156 may be coupled to belt retractor mechanism 154 to actuate the retractor mechanism in the event of a collision. Typical seat belt retractor mechanisms which may be used in conjunction with the safety belt embodiments of the present invention are described in U.S. Pat. Nos. 5,743,480, 5,553,803, 5,667,161, 5,451,008, 4,558,832 and 4,597,546, incorporated herein by reference. Illustrative examples of typical pretensioners with which the safety belt embodiments of the present invention may be combined are described in U.S. Pat. Nos. 6,505,790 and 6,419,177, incorporated herein by reference.

Safety belt assembly 150 may also include a crash event sensor 158 (for example, an inertia sensor or an accelerometer) which operates in conjunction with a known crash sensor algorithm that signals actuation of belt pretensioner 156 via, for example, activation of a pyrotechnic igniter (not shown in FIG. 8) incorporated into the pretensioner. U.S. Pat. Nos. 6,505,790 and 6,419,177, previously incorporated herein by reference, provide illustrative examples of pretensioners actuated in such a manner.

Unless otherwise noted, elements of the gas generating system may be fabricated using methods known in the art. Also, it will be understood that the embodiments of the gas generating system described herein are not limited to use in the applications described herein, but may also be used in other applications in which a gas generating system is required.

It will be understood that the foregoing description of the present invention is for illustrative purposes only, and that the various structural and operational features herein disclosed are susceptible to a number of modifications, none of which departs from the spirit and scope of the present invention. The preceding description, therefore, is not meant to limit the scope of the invention. Rather, the scope of the invention is to be determined only by the appended claims and their equivalents.

What is claimed is:

1. An inflator for generating pressurized gases for inflating a vehicle airbag, the inflator comprising;
   an inflator housing; and
   a filter contained within the housing, the filter comprising a plurality of discrete, continuous gas flow passages extending therethrough for directing gases in a direction substantially parallel with a longitudinal axis of the inflator;
   wherein the inflator is in fluid communication with the vehicle airbag after activation of the inflator.

2. The inflator of claim 1 wherein the gas flow passages are substantially parallel with each other.

3. The inflator of claim 1 wherein each gas flow passage of the plurality of gas flow passages has a substantially continuous cross-sectional shape along a length of the passage.

4. The inflator of claim 1 wherein each gas flow passage of the plurality of gas flow passages has a substantially continuous cross-sectional area along a length of the passage.

5. The inflator of claim 1 wherein the filter comprises a metallic material.

6. The inflator of claim 1 wherein at least a portion of the filter is coated with a catalytic material for promoting a chemical reaction in a gas generated by combustion of a gas generant composition.

7. The inflator of claim 1 wherein at least a portion of the filter is plated with a metallic material.

8. The inflator of claim 1 wherein the filter is coated with at least one material which chemically reacts with a gas generated by combustion of a gas generant composition to change the composition of the gas during passage of the gas through the filter.

9. The inflator of claim 1 wherein at least a portion of the gas flow passages each have a substantially hexagonal cross-section.

10. The inflator of claim 1 wherein at least a portion of the gas flow passages each have a substantially corrugated cross-section.

11. The inflator of claim 1 wherein to filter has a substantially circular cross-section.

12. The inflator of claim 1 wherein at least a portion of the gas flow passages each have a substantially elliptical cross-section.

13. The inflator of claim 1 wherein at least a portion of the gas flow passages each have a substantially rectangular cross-section.

14. An inflator for generating gases, the inflator comprising:
an inflator housing;
a filter positioned within the housing, the filter including a plurality of elongated, discrete, continuous gas flow passages extending therethrough, a first end face and a second end face opposite the first end face, and wherein the plurality gas flow passages extend between the first end face and the second end face to convey gases between the first end face and the second end face; and
a gas generant material positioned within the housing and exterior of the filter prior to activation of the inflator.

15. The inflator of claim 14 wherein the filter is structured such that gases may enter the filter only via one of the first end face and the second end face, and gases may exit the filter only via the other one of the first end face and the second end face.

16. An inflator comprising:
a housing;
a gas generant combustion chamber in the housing;
a filter positioned within the housing separate from the combustion chamber so as to enable fluid communication with the combustion chamber upon activation of the inflator, the filter comprising a plurality of discrete, continuous gas flow passages extending therethrough, wherein an axis extends through the filter, and wherein the plurality of gas flow passages extends substantially parallel with the axis; and
a gas generant material positioned within the gas generant combustion chamber and exterior of the filter prior to activation of the inflator.

17. An inflator comprising:
a housing defining a housing interior;
a gas generant combustion chamber in the interior;
a gas generant material positioned within the gas generant combustion chamber;
a filter positioned in the interior, the filter including a plurality of discrete, continuous gas flow passages extending therethrough; and
a second chamber in the interior, the second chamber including at least one gas exit aperture to enable fluid communication between the filter and an exterior of the housing after activation of the inflator;
wherein the filter occupies substantially an entire volume of the interior between the combustion chamber and the second chamber.

18. A gas generating system comprising:
a housing;
an axis extending through the housing;
a combustion chamber defined within the housing and positioned along the axis;
a gas generant material positioned within the combustion chamber;
a diffuser chamber defined within the housing and positioned along the axis;
a filter positioned along the housing and within the housing so as to enable fluid communication with the combustion chamber and the diffuser chamber upon activation of the gas generating system, the filter including a plurality of discrete, continuous gas flow passages extending therethrough for directing gases in a direction substantially parallel with a longitudinal axis of the housing.

19. A vehicle occupant protection system comprising:
an inflatable element; and
a gas generating system for generating gases to inflate the inflatable element, the gas generating system including a filter in accordance with claim 1.

* * * * *

UNITED STATES PATENT AND TRADEMARK OFFICE
CERTIFICATE OF CORRECTION

PATENT NO. : 7,681,916 B2 Page 1 of 1
APPLICATION NO. : 11/648457
DATED : March 23, 2010
INVENTOR(S) : Krupp et al.

It is certified that error appears in the above-identified patent and that said Letters Patent is hereby corrected as shown below:

Column 8, Line 38, Claim 19, delete claim 19 should read
"A vehicle occupant protection system comprising:
an inflatable element; and
a gas generating system in accordance with claim 18 for generating gases to inflate the inflatable element."

Signed and Sealed this

Twenty-first Day of December, 2010

David J. Kappos
*Director of the United States Patent and Trademark Office*